Oct. 25, 1966 F. J. CALLAHAN, JR., ETAL 3,280,836
DOUBLE PATTERN METERING VALVE
Filed Sept. 28, 1962 2 Sheets-Sheet 1
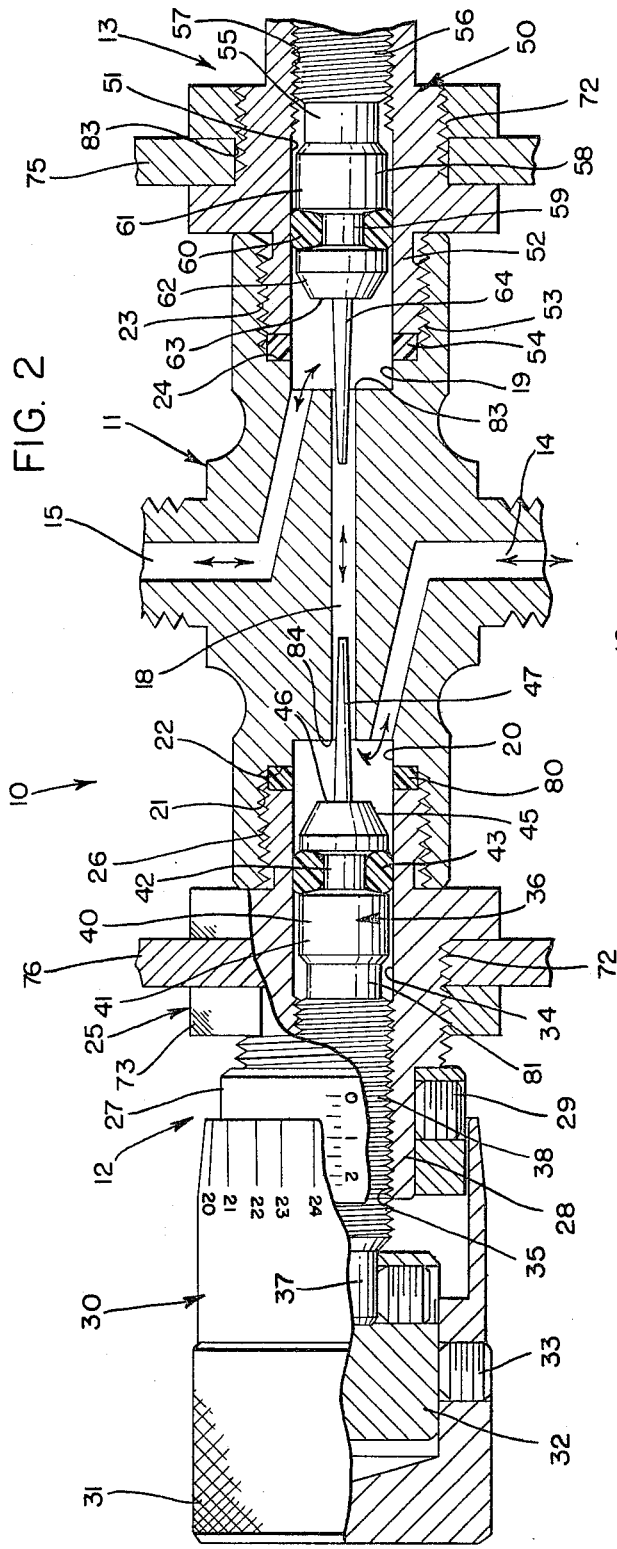
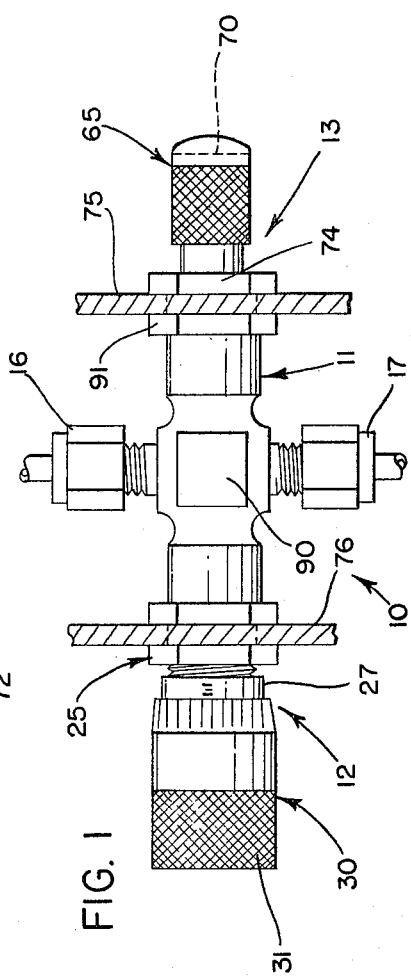
INVENTORS.
FRANCIS J. CALLAHAN, JR. &
BERNARD J. GALLAGHER
BY
*Fay & Fay*
ATTORNEYS Oct. 25, 1966   F. J. CALLAHAN, JR., ETAL   3,280,836
DOUBLE PATTERN METERING VALVE Filed Sept. 28, 1962   2 Sheets-Sheet 2

INVENTORS.
FRANCIS J. CALLAHAN, JR. &
BERNARD J. GALLAGHER
BY
*Fay & Fay*
ATTORNEYS

3,280,836
DOUBLE PATTERN METERING VALVE

Francis J. Callahan, Jr., Chagrin Falls, and Bernard J. Gallagher, Cleveland Heights, Ohio, assignors to Nuclear Products Company, Cleveland, Ohio, a corporation of Ohio
Filed Sept. 28, 1962, Ser. No. 226,955
The portion of the term of the patent subsequent to December 25, 1979, has been disclaimed
6 Claims. (Cl. 137—614.21)

This application is a continuation-in-part of our application Serial No. 10,389, filed February 23, 1960 and now Patent No. 3,070,117, issued December 25, 1962.

This invention relates to valves in general and in more particularly directed to those valves which have found particular application in areas where fine metered flow control is desired.

The problem

In recent years the trade has devoted a considerable amount of attention towards the development of metering valves, which would provide satisfactory functional results in a wide range of applications. In such a developmental program, it is always necessary to consider the practicality of manufacturing, maintaining and installing such valves. One criterion which was of paramount importance to designers in the development of a valve assembly was the minimization of dead space or internal volume. Due to the particular makeup of proposed designs, dead space was not always reduced to the desired minimum values. In the main, the particular structural makeup of the available metering valves was such that they did not satisfy many of the demands of good design. Fineness in control as well as the overall miniaturization of the assembly was of equal importance in design considerations.

A further factor worthy of design consideration was a metering valve assembly which embodied all the necessary attributes from a design standpoint, which would lend itself to fine accurate flow characteristics as well as being structurally simple. When the design requisites are fulfilled along with structural simplicity and reliability, severe reduction in maintenance costs usually follows, since fewer opportunities for failure are present.

The solution

This invention proposes a practical solution to the problem, alluded to above, within the framework of the design considerations discussed therein.

The double pattern metering valve herein disclosed is unique in that it combines dual opposed metering valves in a single body. In instrumentation and experimental systems, it is important from the standpoint of time required, accuracy of the system, and ease of use, to provide a valve assembly with dual valves in series whereby one valve may be adjusted to the desired flow, and the other valve used as a vernier as well as a control shut-off. It is obvious when an experiment or function of an instrumentation system is complete, that it becomes necessary to shut off flow.

In the instant disclosure, one of the valves will control the rate of flow, whereas the other will operate as a fine adjustment for flow control as well as terminating flow when desirable without disturbing the setting of the other valve. It is apparent that once flow is terminated, the closed valve may be opened and the other valve, having been locked in place, will continue to meter flow at the set rate, with the shut-off valve then becoming a vernier for fine adjustment over the set range.

Since the experimental and instrumentation systems are often used for a variety of fluids ranging from liquids to gases, it frequently becomes necessary to purge the system of unwanted fluids before introduction of a diverse fluid. In the interest of a complete purging, design considerations demand the elimination of the crevices, pockets and the like, which would serve to trap the unwanted fluid despite purging. The double pattern metering valve of the instant embodiment fulfills the design requirements, in that the dead space is minimized, along with the elimination of crevices, traps, pockets and the like. For example, in one commercial embodiment the dead space was less than .005 cubic inch. By inspection of the drawing, it becomes apparent to one skilled in the art that the fluid passages are of simple, smooth design and strategically seated so as to preclude fluid contact with threads and like structure which would make a complete purging difficult at best.

It is, therefore, an object of this invention to provide a double pattern metering valve which is structurally and operatively simple.

It is a further object of this invention to provide a double pattern metering valve which will be easily installed and which will require little maintenance.

It is a further object of this invention to provide a double pattern metering valve, featuring extremely fine flow control throughout its full range of operation.

It is a still further object of this invention to provide a double pattern metering valve which affords fine flow characteristics through the use of opposed, generally conical needles which seat against the orifice of the valve.

It is a still further object of this invention to provide a double pattern metering valve which minimizes dead space, while providing dual controls which give a high degree of accuracy in metering applications.

It is still a further object of this invention to provide a double pattern metering valve which may be very quickly and conveniently installed and is simply adjusted.

It is a still further object of this invention to provide a double pattern metering valve assembly wherein one valve may be used for control and the other may be used for shut-off purposes, thereby requiring less time for setting up an operation as well as providing extremely fine control during operation.

It is a further object of this invention to provide a metering valve susceptible of use in an instrumentation system which will eliminate expense in constructing fluid handling systems, as well as reducing space requirements.

Further and fuller objects of the invention will become readily apparent when reference is made to the accompanying drawings wherein:

FIG. 1 is an elevational view of the double pattern metering valve with fragmentary portions of the bulkheads supporting the same in cross section;

FIG. 2 is an enlarged fragmentary view of the double pattern metering valve shown in FIG. 1 with parts in cross section to illustrate the opposed conical needles and the micrometer adjustment therefor;

Description

Figure 3:
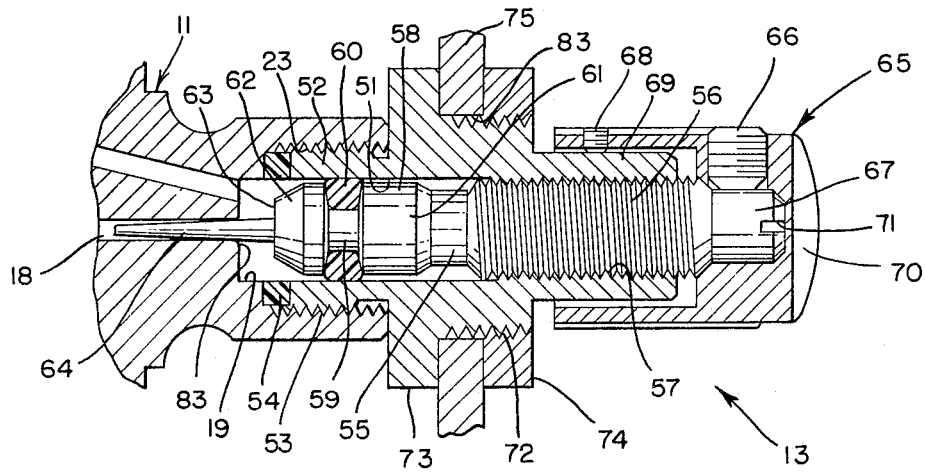
FIG. 3 is an enlarged cross sectional view of the right-hand portion of FIG. 1, showing the valve closed.

Referring now more particularly to FIGS. 1 and 2 of the drawings, the double pattern metering valve 10 includes an elongated body portion 11 with valve actuating assemblies 12 and 13 at opposite ends thereof. The body portion has an inlet 14 and an outlet 15. It is obvious that these may be reversed if desired. Suitable connecting means may be provided at each of the inlet and outlet portions. Any combination of fittings may be used, such as female and male threads, welded, brazed or soldered fittings, as well as the popular "Swagelok"

fittings 16 and 17 shown. Tool pads 90 are provided on the body 11 to receive suitable tool means for ease in installation of the assembly.

A central passage 18 extends axially through the body 11 communicating at opposite ends with counterbored portions 19 and 20. Each of the respective counterbored portions communicates with the inlet 14 and outlet 15, respectively, as well as being in controlled communication with each other. The counterbored portion 20 is provided with internal thread means 21 and a shoulder 22. The counterbored portion 19 is similarly provided with internal thread means 23 and shoulder 24 for purposes hereinafter to become apparent.

The actuating assembly 12 is comprised of a bonnet assembly 25 which has a threaded extension 26 to interfit with the threads 21 of the counterbore 20. Suitable seal means, such as those indicated at 80, are received between the bonnet 25 and the shoulder 24 to prevent leakage along the thread means 21. The seal may be of any suitable elastomer, such as rubber, Viton, Teflon and so on.

The actuating assembly 12 further includes a micrometer gauge ring 27 received over and attached to a reduced cylindrical extension 28 of the bonnet. Suitable means, such as a set screw 29, is provided to lock the micrometer gauge ring adjustably thereto. A micrometer head 30, knurled as at 31 to provide a good grip when adjustment is necessary, is adjustably attached to a stem extension 32 by means of a set screw 33. The micrometer head 30 and gauge ring 27 are provided with the necessary markings to make any setting easily obtained. The value of such will become more apparent when the operation is explained hereinafter. The bonnet 25 is provided with a passage 34 which is of approximately the same diameter as the counterbored portion 20. Fine thread means 35 are provided through a portion of the bore 34 to threadably receive a stem assembly 36.

The stem assembly 36 is comprised of a cylindrical portion 37 to receive the stem extension 32. Thread means 38 which cooperate with the internal threads 35 of the bonnet 25 are provided on the stem assembly 36. The threads 38 terminate in a groove 81 to form a head 40 having a cylindrical portion 41 which is of lesser diameter than the bore 34. A trapezoidal groove 42 is provided in the head 40 to receive a suitable seal means 43. The cylindrical portion terminates in a frusto-conical portion 45 which merges with a substantially radial shoulder 46. A slender, elongated needle 47 extends from the shoulder 46 into the passageway 18 of the body portion 11.

Each of the stems is formed of a hard material, such as stainless steel, heat treated to a hardness of 33 on the Rockwell "C" scale. The body 11 is formed of a softer material to insure longer valve life. The needles seat on the annular seating lips 83 and 84 formed by the intersection of the counterbores 19 and 20, and the passage 18. The seating occurs on the periphery of the needle at a point between its ends since the base of the needle is larger in diameter than the passageway 18 while the free end is lesser. This enables a high degree of control to be maintained because of the low rate of change of area of the opening as adjustment is effected.

In a typical embodiment of the invention, threads 35 and 38 would be of the order of 40 pitch, to impart a micrometer-like control to the extending and retracting movements of the stem through the rotation of the micrometer cap 30.

The taper on the elongated needle 47 would be formed on an included angle of about 3°, which gives a very high degree of accuracy. The diameter of the central passageway would be about 0.055 inch and the length of the passageway 18 would be minimized to a point to prevent the possibility of the needles touching when in the closed position, as will be hereinafter described.

The bonnet assembly 13 is similar in its makeup to the bonnet assembly 12 in that it comprises a bonnet portion 50 having a passageway 51 extending centrally therethrough. Each of the respective bonnet assemblies is provided with an externally threaded portion 72 which merges into a radial shoulder 73 having tool pads 91 thereon. A jam nut 74 cooperates with the threaded portion 72 to clamp the valve to a bulkhead such as those shown fragmentarily at 75 and 76. If spaced bulkheads are not available, suitable means, such as brackets and the like, may be used to effect a proper mounting arrangement.

A cylindrical extension 52 is provided on the bonnet assembly 13 having thread means 53 which cooperate with the threads 23 of the counterbore 19. Interposed between the shoulder 24 and the end portion of the cylindrical extension 52 is a suitable seal means 54, which fluid tightly joins the bonnet assembly 13 to the body 11.

A stem assembly 55 has fine male threads 56 which cooperate with the female threads 57 of the passage 51. The stem is provided with a head 58 of similar makeup to the head 40, including a trapezoidal groove 59 to receive a suitable sealing means, such as the O-ring indicated at 60. The cylindrical portion 61 of the head 58 terminates in a frusto-conical surface 62 which merges with a substantially radial shoulder 63. A slender elongated needle 64 extends from the shoulder 63 into the passageway 18 so that the needles 47 and 64 are approximately axially aligned while being opposed to each other.

Figure 4:
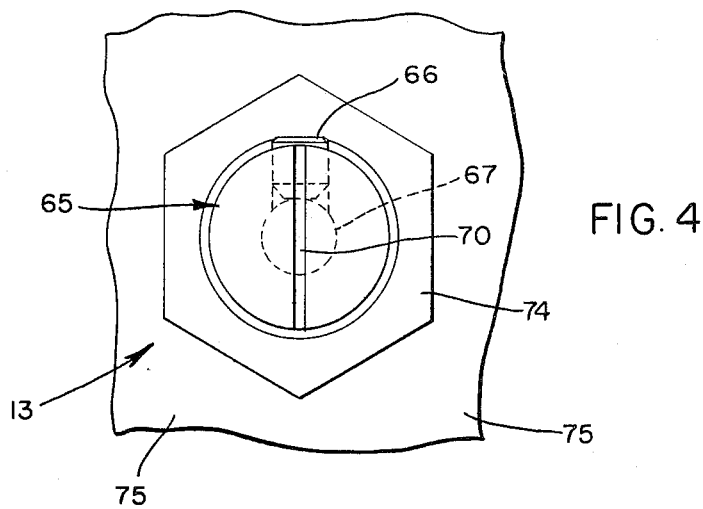
FIG. 4 is an end view of the fragmentary portion shown in FIG. 3.

As is best seen in FIG. 3, a knurled cap 65 is provided with a set screw 66 to attach the cap to the cylindrical extension 67 of the stem 55. The cap 65 is provided with an additional set screw 68 to lockingly engage a reduced cylindrical extension 69 of the bonnet assembly 50. This permits locking of the cap in any desired position precluding accidentally disturbing the settings. The cap 65 is further provided with a tool slot 70, as seen in FIG. 4, which facilitates adjustment in high temperature applications or in situations where accessibility is a problem. If space becomes of great importance, the cap 65 may be omitted and adjustment may be made by the provision of a tool slot 71 in the cylindrical extension 67 of the stem 55. It is obvious that a micrometer assembly, such as that shown generally at 12, could be provided in lieu of the actuating assembly 13, if desirable.

It is to be appreciated that the cap 65 should be removed only when necessity demands, since the cap serves to protect the threads 56 from foreign materials which could impair the movement thereof.

The cap 65 is of a lesser diameter than the threaded portion 72 of the bonnet 50 to allow it to pass through the aperture 83 in the bulkhead 75 without requiring removal from the assembly. This feature promotes ease and speed in installing the valve assembly 10.

*Operation*

The double pattern metering valve provides exceedingly fine flow control. For example, in one concrete test, the inlet valve having the micrometer head thereon was opened two full turns, the outlet valve was set to meter flow at the rate of 50 cubic centimeters per minute and locked. The two full turns of the inlet valve are now available to adjust the flow from 0 to 50 cubic centimeters per minute, whereas about one-tenth of a turn of the outlet valve would vary the flow rate through the same range. It is obvious that the two full turns of the inlet valve available to adjust over the range set on the outlet valve provide a vernier type adjustment enabling precise flow settings.

Of further importance in the above example was the ability to terminate flow by the inlet valve without disturbing the setting of the outlet valve. When a further experiment, test or the like is run, the inlet valve need only be opened two full turns and the desired 50 cubic centimeters per minute flow rate, represented by the arrows in FIG. 1, is instantly available.

The novel structure of the valve assembly herein disclosed provides a valve which will serve as a shut-off, as well as a fine control over a range set on the opposed valve. The above features coupled with the further advantage alluded to above fulfill the design requirements demanded in applications ranging from gas analysis, line sampling, spectographic and chromotographic services to research applications where fine control or the function of a burette is desired.

For purposes of illustration, certain terminology and concrete embodiments have been employed in description of the inventive principles involved herein. It will be immediately obvious, however, to those possessing but ordinary skill in the art, that a number of departures could be made with respect to the terminology and illustrative embodiments employed without at the same time departing from the true spirit of the invention. It is not intended, therefore, to be limited by the specific illustrated embodiments shown, nor the descriptive terminology employed, but only by the scope and spirit of the appended claims.

We claim:
1. A double pattern metering valve comprising a housing having a fluid passage extending therethrough, said passage communicating with counterbored portions at opposite ends of said housing and thereby forming an annular seating lip, inlet means communicating with one of said counterbores and outlet means communicating with the other of said counterbores, first and second elongated stem means each having a slender elongated conical needle member thereon, said stem means being positioned in the opposite ends of said housing, with the free end of each of said needle members extending through said seating lip into said passageway, and means to extend and retract each of said stem means.

2. A device as defined in claim 1 in which the means for extending and retracting the first and second stem means includes relatively fine thread means mounting the stem within the housing in order to provide accurate control of movements thereof.

3. The metering valve of claim 2 wherein said means to extend and retract said first and second stem means further includes cap means on said first and second stem means, at least either or both of said cap means being a micrometer means.

4. The metering valve of claim 1 wherein each of said first and second stem means is provided with a groove means adjacent the end of said stem means having the needle member thereon and seal means in said groove.

5. The metering valve of claim 3 wherein said groove is trapezoidal in cross section.

6. A double pattern metering valve comprising:
a housing having a fluid passageway extending therethrough;
said passage communicating with first counterbored portions at opposite ends of said housing and thereby forming an annular seating lip;
second counterbored portions adjacent to and coaxial with said first counterbored portions with a radially extending shoulder formed at the juncture of said counterbored portions;
inlet means communicating with one of said first counterbored portions and outlet means communicating with the other of said first counterbored portions;
a bonnet assembly threadedly received in each of said second counterbored portions;
seal means interposed between the end of each of said bonnet assemblies and the respective shoulder;
a central bore in each of said bonnet assemblies having a diameter substantially equal to the diameter of said first counterbored portions whereby said central bore is coaxially aligned with and forms an extension of said first counterbored portion;
elongated stem means in each of said central bores;
each of said stem means including a slender elongated conical needle member attached thereto with the free end of said needle extending through said seating lip into said fluid passage; and
actuating means associated with each of said stem means operable to reciprocate said stem means in said central bore whereby the penetration of said needle member in said fluid passage may be varied.

References Cited by the Examiner

UNITED STATES PATENTS

| 1,315,020 | 9/1919 | Hilger | 137—614.21 X |
| 2,209,709 | 7/1940 | Weatherhead | 137—625.5 X |
| 2,552,226 | 5/1951 | Singer | 137—614.21 |
| 2,833,307 | 5/1958 | Henderson | 251—205 X |
| 3,070,117 | 12/1962 | Callahan | 137—360 |

FOREIGN PATENTS

| 120,896 | 6/1900 | Germany. |
| 2,808 | 2/1907 | Great Britain. |

WILLIAM F. O'DEA, *Primary Examiner.*

J. O'NEILL, *Assistant Examiner.*